(12) United States Patent
Lai

(10) Patent No.: US 6,446,543 B1
(45) Date of Patent: Sep. 10, 2002

(54) FOOD COOKING ACCESSORY FOR SNOWMOBILE

(76) Inventor: Kandace H. Lai, 230 S. Garfield Ave., Monterey Park, CA (US) 91755

( * ) Notice: Subject to any disclaimer, the term of this patent is extended or adjusted under 35 U.S.C. 154(b) by 0 days.

(21) Appl. No.: 08/938,531

(22) Filed: Sep. 26, 1997

(51) Int. Cl.$^7$ .................. A23L 3/00; B65G 17/12; B65G 47/34; F24C 9/00

(52) U.S. Cl. .................. 99/339; 99/483; 126/19.5; 126/261

(58) Field of Search .................. 99/340, 339, 357, 99/422, 432, 427, 467, 470, 476, 483; 126/19.5, 20, 21 A, 261; 237/12.3 B, 12.3 C; 186/41, 50; 296/22, 24.1; 426/523

(56) References Cited

U.S. PATENT DOCUMENTS

| | | | | |
|---|---|---|---|---|
| 2,168,491 A | * | 8/1939 | Parmeter | 99/357 |
| 2,970,589 A | * | 2/1961 | Cushman | 99/483 |
| 3,590,802 A | * | 7/1971 | Fried | 126/19.5 |
| 3,818,889 A | * | 6/1974 | Lillo | 126/19.5 |
| 3,874,361 A | * | 4/1975 | Parrinello | 126/19.5 |
| 4,162,670 A | * | 7/1979 | Hays | 237/12.3 B |
| 5,233,969 A | * | 8/1993 | Koledin | 126/20 |
| 5,582,095 A | * | 12/1996 | Rial | 99/483 |

* cited by examiner

Primary Examiner—Timothy F. Simone
(74) Attorney, Agent, or Firm—David W. Lee; David and Raymond Patent Group; Raymond Y. Chan (57) ABSTRACT

A food cooking accessory for snowmobile includes, a stainless steel oven, an attaching accessory means for receiving said stainless steel oven, and an affixing device for affixing a food cooking accessory to an exhaust pipe of a snowmobile. The food cooking accessory for snowmobile allow the user to evenly cook the food at high elevation without wasting the cooking time and leave no mess to clean up.

5 Claims, 7 Drawing Sheets

FOOD COOKING ACCESSORY FOR SNOWMOBILE

FIELD OF THE PRESENT INVENTION

The present invention relates to a food cooking accessory, and more particularly to a food cooking accessory for attaching on the snowmobile to warm up any pre-cooked food such as fried chicken, baked potato, fried shrimp, burrito, meatball, muffin, fried rice, salmon, hot dog, and hamburger at 10,000 feet above sea level.

BACKGROUND OF THE PRESENT INVENTION

Have you try to cook an egg in boiling water on a mountain at 10,000 feet above red sea level? If you have, you would know that it take much longer time to fully cook the egg on the mountain than at home. From science class, we learn that the atmosphere pressure can affect the boiling point of water at higher elevation and the temperature required to boiling water is relative lower. However, although the water is boiled, but the temperature are not high enough to cook the food.

For those people who lives on the mountains or place that snows six months out of each year, hot food and drink provide great pleasure to them. But as mention above, to cook the food at high elevation take much longer time than on the lower elevation and most people would rather spend time to enjoy their life or work rather than wasting time to prepare food.

What if we can just spend few minutes to prepare our food and when we want to have hot steamy food, the food would be ready for us. Does it sound to good to be true? All we need is a snowmobile, a food cooking accessory that can be attach on the snowmobile.

SUMMARY OF THE PRESENT INVENTION

The main objective of the present invention is to provide a food cooking accessory for snowmobile which can be easily adapted to the exhaust pipe of the snowmobile, so that after a ride on the snowmobile, the food would be cooked or warmed by the hot steam of the exhaust pipe.

Another objective of the present invention is to provide a food cooking accessory for snowmobile which can save people's cooking time on high elevation ground due to high temperature produced by the exhaust pipe of the snowmobile.

Another objective of the present invention is to provide a food cooking accessory for snowmobile which comprises an aluminum heat sink base that provides a uniform heating of the food.

Another objective of the present invention is to provide a food cooking accessory for snowmobile which allows the people to travel without carrying cooking equipment and leaves no mess to clean.

Accordingly, a food cooking accessory for snowmobile of the present invention comprises a stainless steel oven, an attaching accessory means for receiving the stainless steel oven, and an affixing means for affixing a food cooking accessory to an exhaust pipe of a snowmobile.

DETAILED DESCRIPTION OF THE PREFERRED EMBODIMENT

Referring to FIGS. 1 to 5 of the drawings, a first preferred embodiment of the present invention of a food cooking accessory for snowmobile is illustrated. The food cooking accessory for snowmobile comprises a stainless steel oven 10, an attaching accessory means 20 for receiving the stainless steel oven 10, and an affixing means 30 for affixing the food cooking accessory to an exhaust pipe E of the snowmobile.

Figure 1:
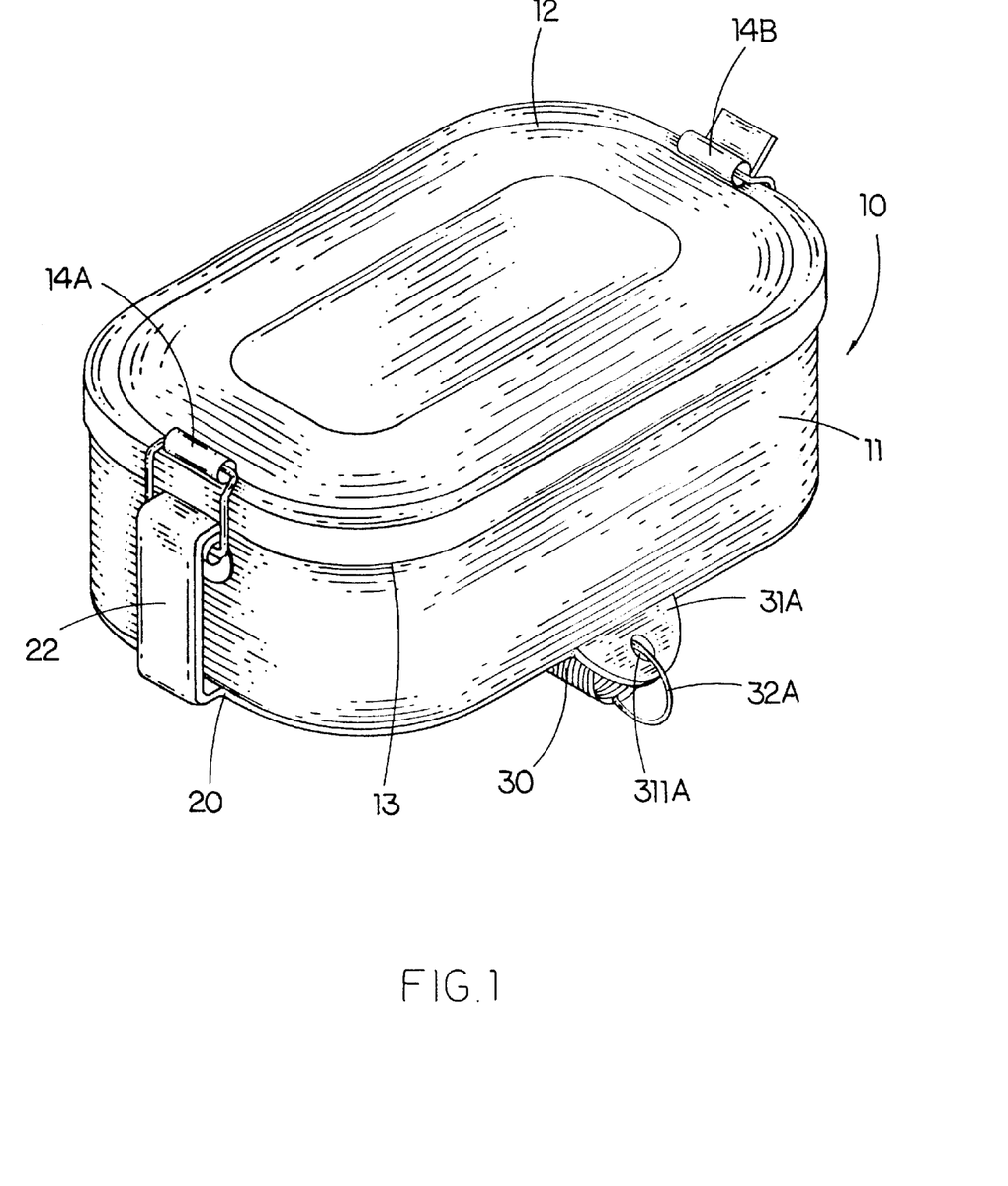
FIG. 1 is a perspective view of a food cooking accessory according to a first preferred embodiment of the present invention.
Figure 2:
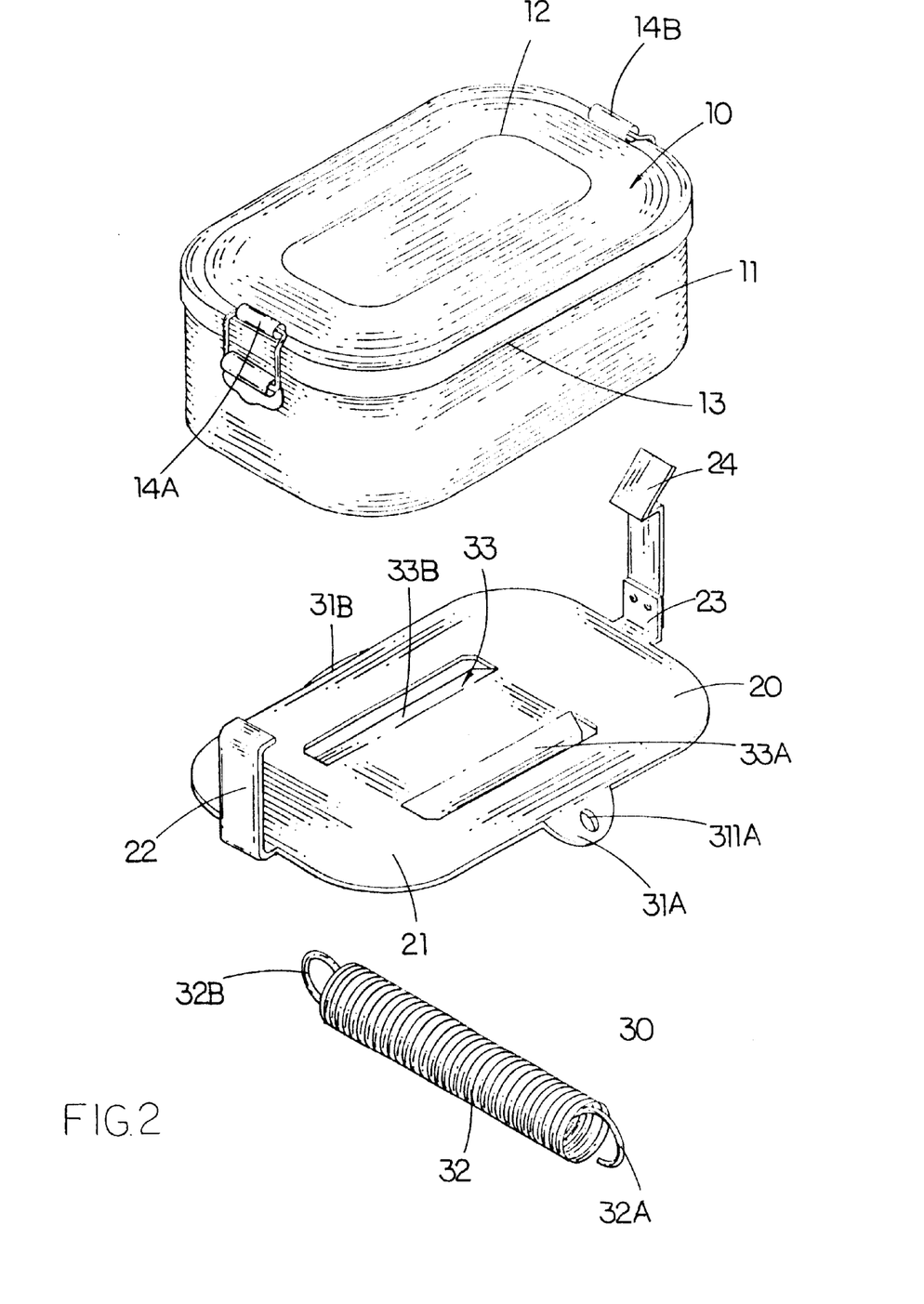
FIG. 2 is a exploded view of a food cooking accessory according to the above first preferred embodiment of the present invention.
Figure 3:
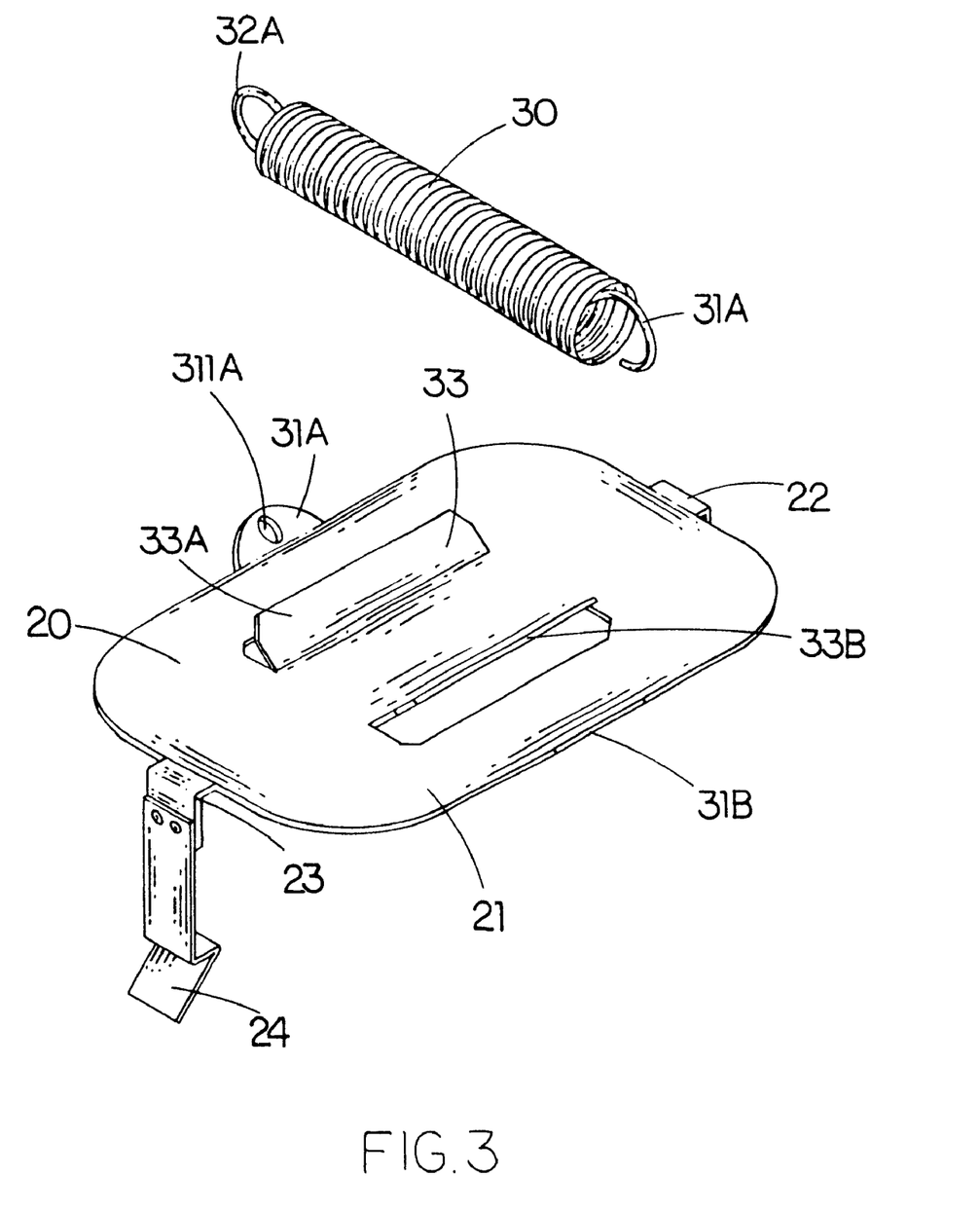
FIG. 3 is a perspective view of an attaching accessory means from a bottom side thereof according to the above first preferred embodiment of the present invention.
Figure 4:
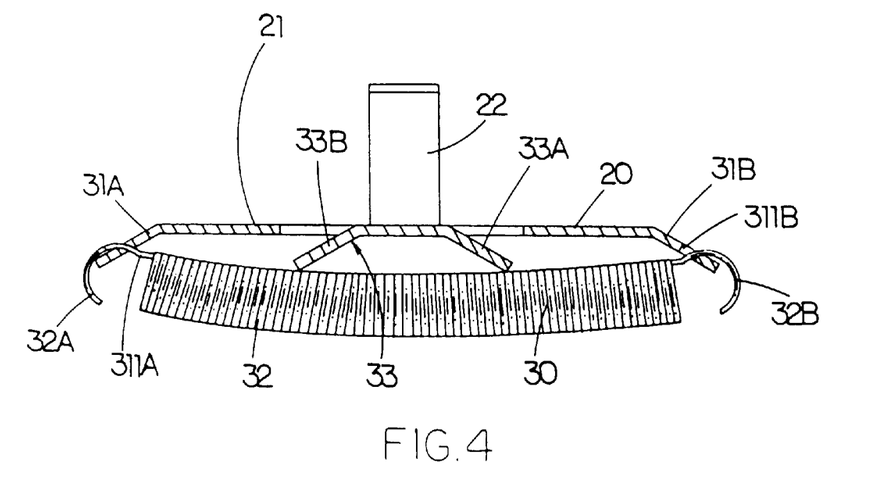
FIG. 4 is a sectional view of the attaching accessory means according to the above first preferred embodiment of the present invention.

Referring to FIGS. 1 and 2 of the drawings, the stainless steel oven 10 comprises a container 11, a top lid 12 for covering the container 11, a receiving chamber 13 disposed within the container 11 for the food to store therein, and a pair of locking hooks 14A, 14B positioned on opposite sides of the container 11 for keeping the top lid 12 tightly cover on the container 11.

As shown in FIGS. 1 to 4 of the drawings, the attaching accessory means 20 comprises an aluminum heat sink base 21 which provides uniform heating to the stainless steel oven 10, a flat n-shape retaining wall 22 integrally protruded from one edge of the aluminum heat sink base 21, a L-shape retaining wall 23 integrally protruded from another edge of the aluminum heat sink base 21, and a flexible clip 24 connected to a free end of the L-shape retaining wall 23, wherein the stainless steel oven 10 is engaged between the flat n-shape retaining wall 22 and the L-shape retaining wall 23 by first inserting one of the locking hooks 14A to be held by the flat n-shape retaining wall 22, the bending back then flexible clip 24 which is disposed on top of the L-shape retaining wall 23 to allow the other locking hook 14B to be inserted thereunder.

Figure 5:
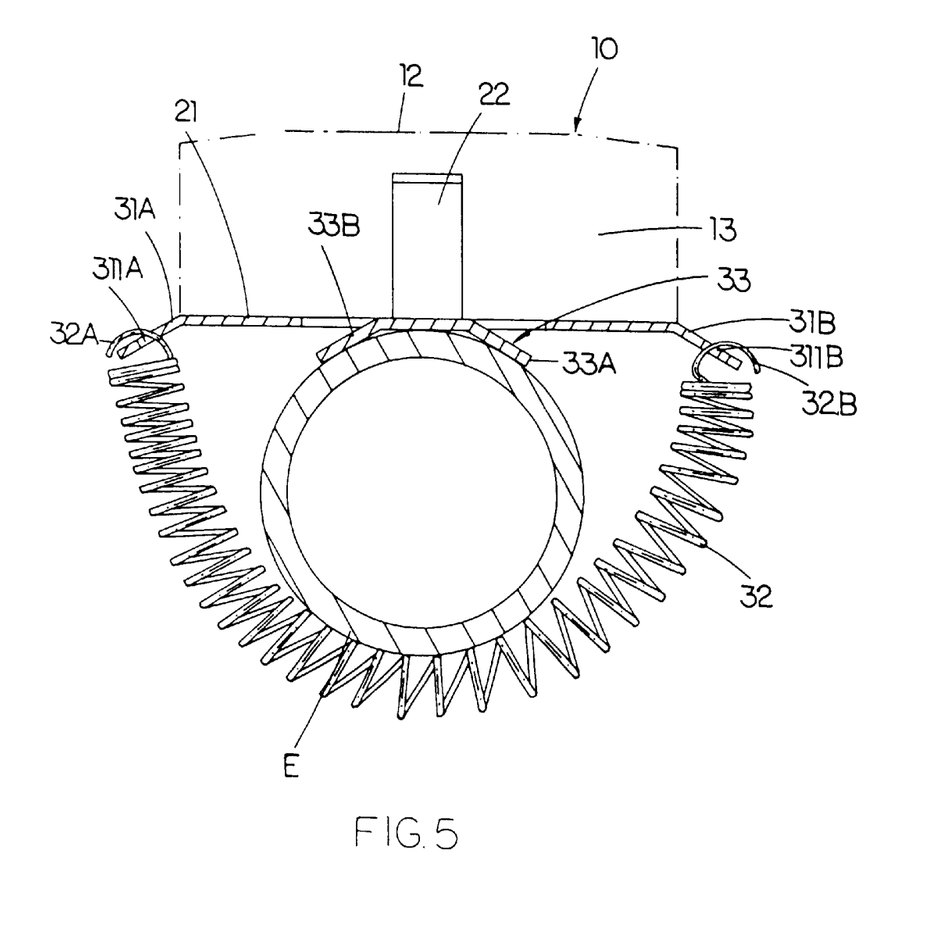
FIG. 5 is a sectional view of the attaching accessory means in connection with the exhaust pipe according to the above first preferred embodiment of the present invention.

According to the first preferred embodiment of the present invention, as shown in FIG. 5 of the drawing, the affixing means 30 of the food cooking accessory for snowmobile comprises two attaching ears 31A, 31B integrally and inclinedly protruded from two opposite edges of a bottom side of the aluminum heat sink base 21, an elastic heat resistance spring 32 having a C-shape adapter 32A, 32B integrally extended from each end, and an exhaust pipe guider 33 which has an outer diameter equal to a diameter of the exhaust pipe E of the snowmobile that the food cooking accessory is designed to adapt to, wherein the exhaust pipe guider 33 is constructed by cutting the aluminum heat sink base 21 and bending to form two guide rails 33A, 33B. The attaching ears 31A, 31B of the affixing means 30 each has a central hole 311A, 311B for the C-shape adapter 32A, 32B of the elastic heat resistance spring 32 to fasten therein respectively, so that the food cooking accessory can be affixed to the exhaust pipe E of the snowmobile as easy as by first fastening one of the C-shape adapters 32A of the elastic heat resistance spring 32 to one of the central holes 311A of the attaching ear 31A of the affixing means 30, then setting the exhaust pipe guider 33 on the exhaust pipe E, and looping the elastic heat resistance spring 32 around the exhaust pipe E so that the C-shape adapter 32B extended from the other end of the elastic heat resistance spring 32 can be fastened to the other central hole 311B.

Referring to FIGS. 6 to 9 of the drawing, a second preferred embodiment of the present invention of a food cooking accessory for snowmobile is illustrated. The food cooking accessory for snowmobile comprises a stainless steel oven 10', an attaching accessory means 20' for receiving the stainless steel oven 10', and an affixing means 30' for affixing the food cooking accessory to an exhaust pipe E of the snowmobile, wherein the stainless steel oven 10' of the second preferred embodiment is identical to the stainless steel oven 10' of the first embodiment.

Figure 6:
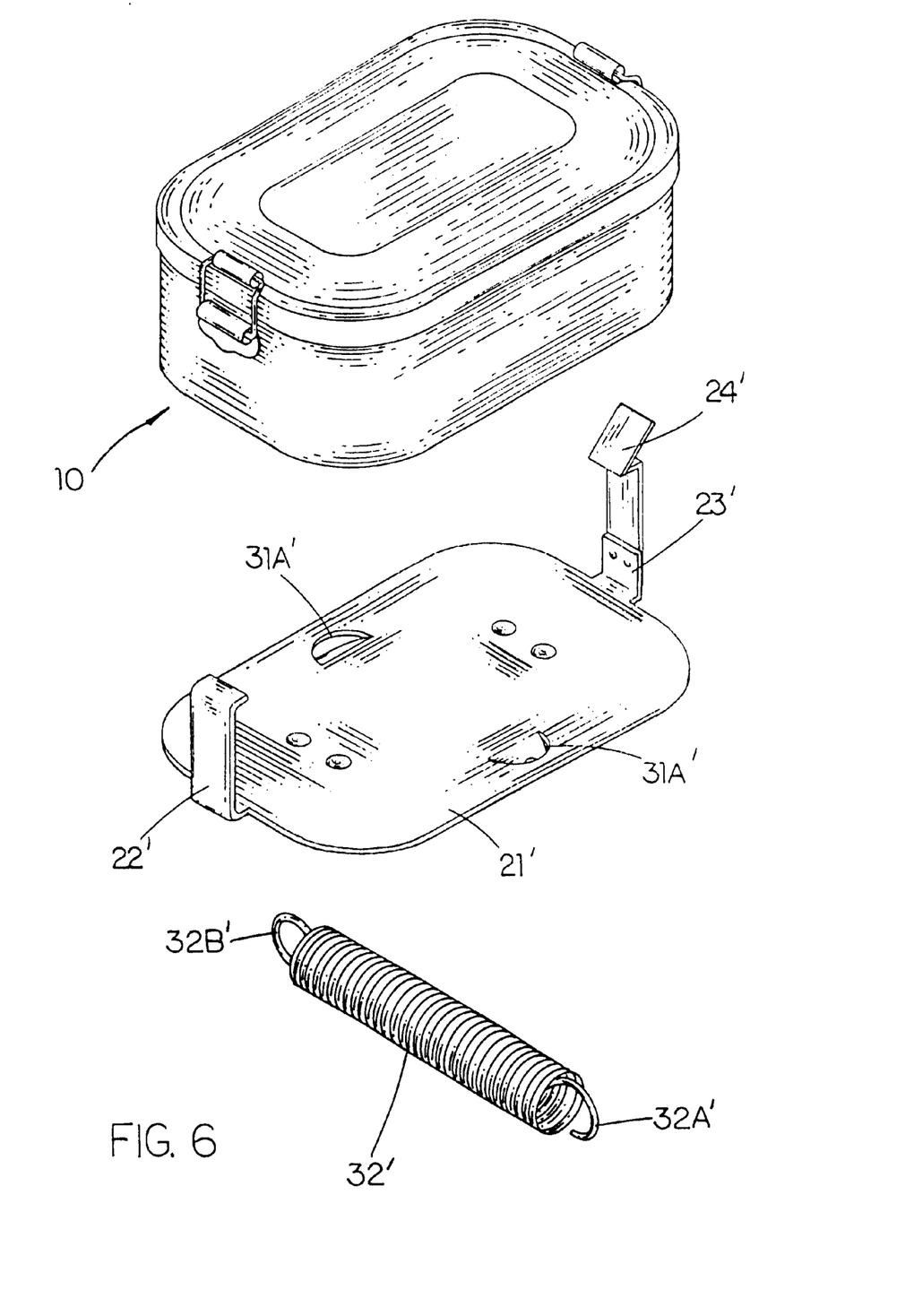
FIG. 6 is a exploded view of a food cooking accessory according to a second preferred embodiment of the present invention.
Figure 7:
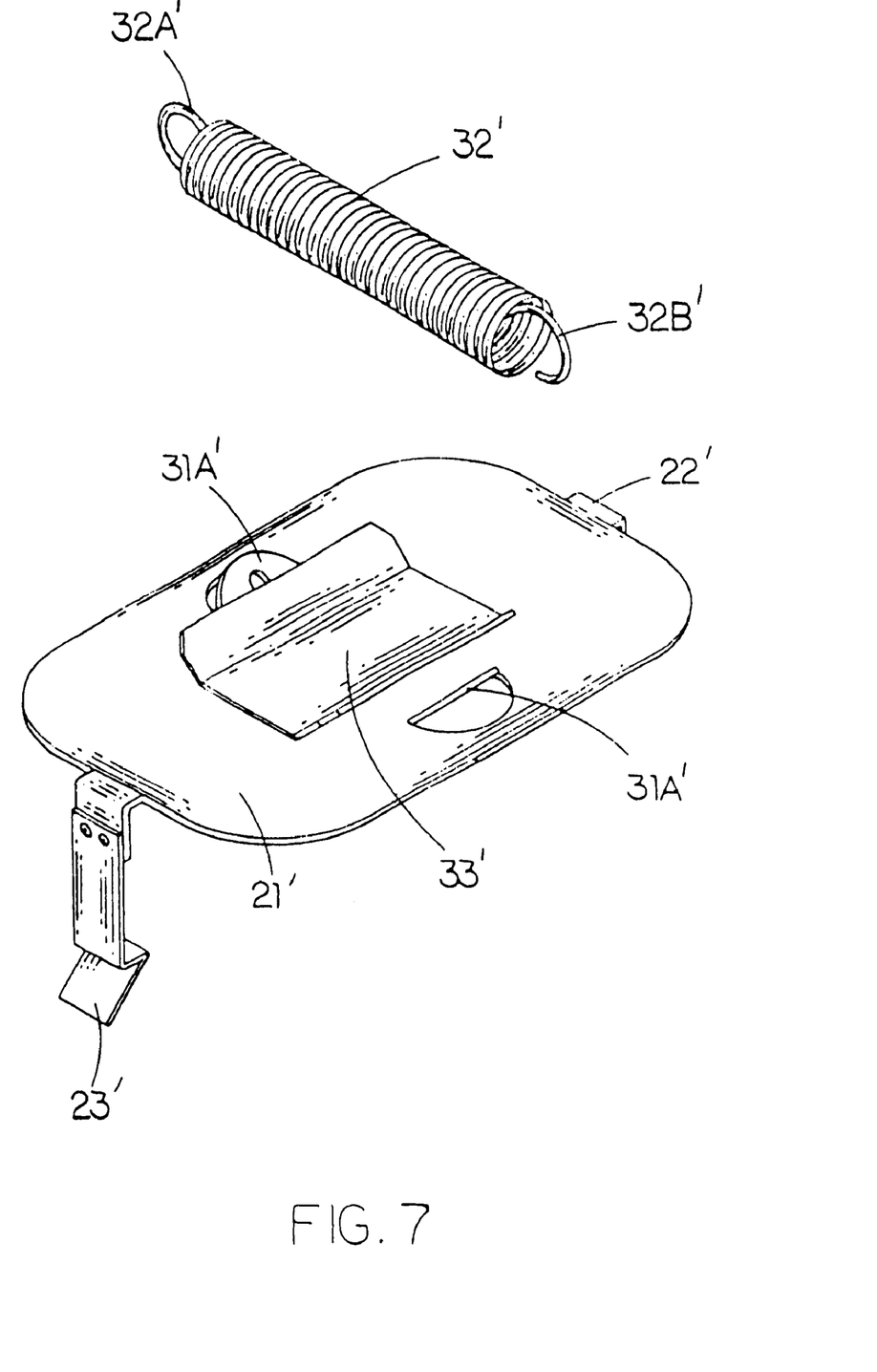
FIG. 7 is a perspective view of an attaching accessory means from a bottom side thereof according to the above second preferred embodiment of the present invention.
Figure 8:
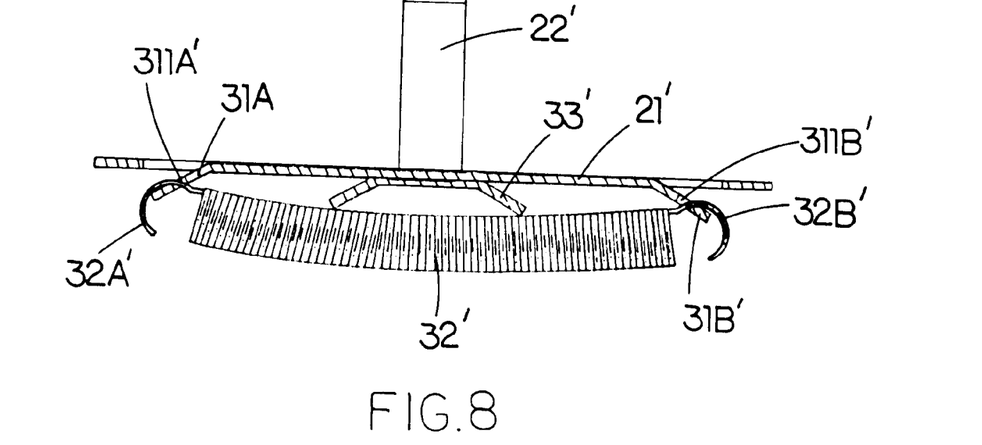
FIG. 8 is a sectional view of the attaching accessory means according to the above second preferred embodiment of the present invention.

Referring to FIGS. 6 to 8 of the drawings, the attaching accessory means 20' comprises an aluminum heat sink base 21' which provides uniform heating to the stainless steel oven 10', a flat n-shape retaining wall 22' integrally protruded from one edge of the aluminum heat sink base 21', a L-shape retaining wall 23' integrally protruded from another edge of the aluminum heat sink base 21', and a flexible clip 24' connected to a free end of the L-shape retaining wall 23', wherein the stainless steel oven 10' is engaged between the flat n-shape retaining wall 22' and the L-shape retaining wall 23' by first inserting one of the locking hooks 14A' to be held by the flat n-shape retaining wall 22', then bending back the flexible clip 24' which is disposed on top of the L-shape retaining wall 23' to allow the other locking hook 14B' to be inserted thereunder.

Figure 9:
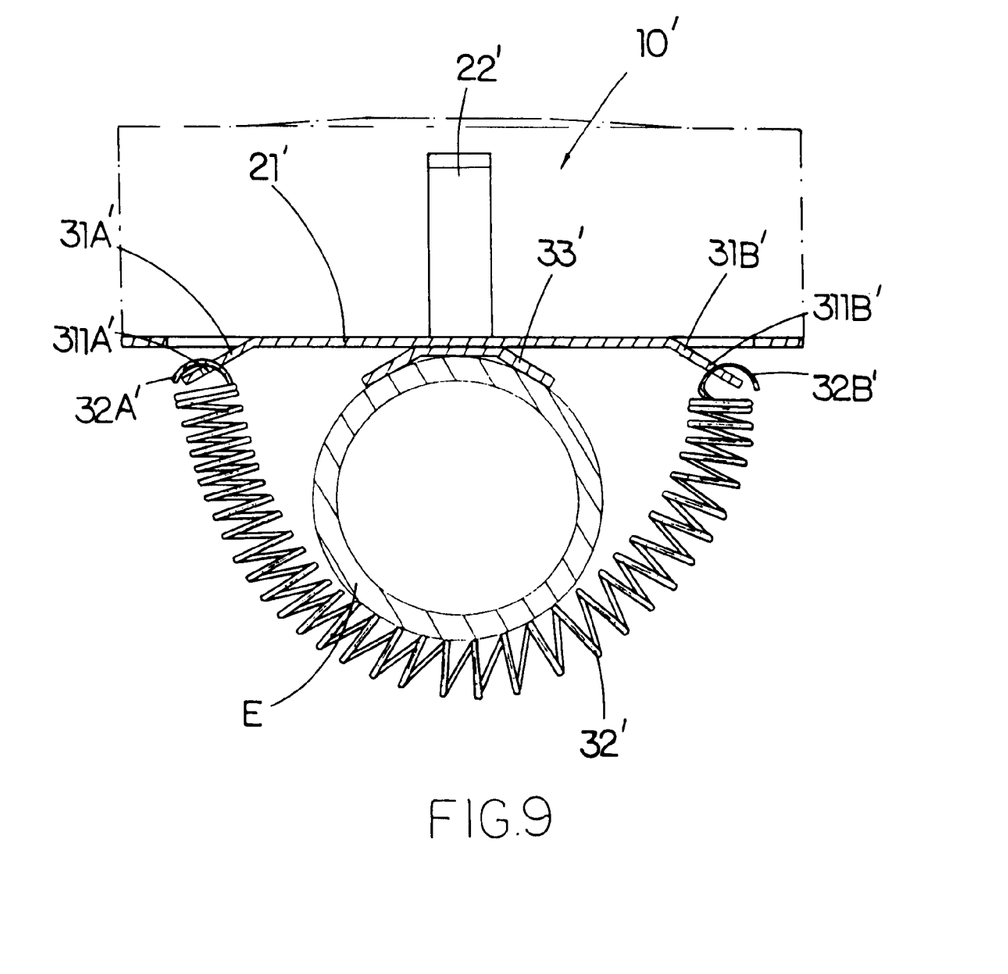
FIG. 9 is a sectional view of the attaching accessory means in connection with the exhaust pipe according to the above second preferred embodiment of the present invention.

According to the second preferred embodiment of the present invention, as shown in FIG. 9 of the drawing, the affixing means 30' of the food cooking accessory for snowmobile comprises two attaching ears 31A', 31B' each of which is constructed by cutting the aluminum heat sink base 21' and bending to form two semi-circular attaching ears 31A', 31B', an elastic heat resistance spring 32' having a C-shape adapter 32A', 32B' integrally extended from each end, and an exhaust pipe guider 33' which has an outer diameter equal to a diameter of the exhaust pipe E of the snowmobile that the food cooking accessory is designed to adapt to, wherein the exhaust pipe guider 33' is connected to a bottom surface of the aluminum heat sink base 21' and the attaching ears 31A', 31B' of the affixing means 30' each has a central hole 311A', 311B' for the C-shape adapter 32A', 32B' of the elastic heat resistance spring 32' to fasten therein respectively, so that the food cooking accessory can be affixed to the exhaust pipe E of the snowmobile as easy as by first fastening one of the C-shape adapters 32A' of the elastic heat resistance spring 32' to one of the central holes 311A' of the attaching ear 31A' of the affixing means 30', then setting the exhaust pipe guider 33' on the exhaust pipe E, and looping the elastic heat resistance spring 32' around the exhaust pipe E so that the C-shape adapter 32B' extended from the other end of the elastic heat resistance spring 32' can be fastened to the other central hole 311B'.

It is worth to mention that when the food cooking accessory for snowmobile of the present invention is affixed to the exhaust pipe E of the snowmobile, the exhaust pipe E is the first section of the exhaust pipe E disposed inside the engine where there is no gas exhaust out. The exhaust pipe E is fully sealed so that the waste gas would only exhaust through the muffler extended outside of the snow mobile. Therefore the hot food would be ready, and safe to eat whenever the user is hungry.

For the users to use the food cooking accessory, all they need to do is install the affixing means 30 along with the attaching accessory means 20 one time while the engine is cold, and leave them on the exhaust pipe E of the snowmobile. Every time the user needs to cook or warm up the food, the user just needs to attach the stainless steel oven 10 to the attaching accessory means and start driving.

I claim:

1. A food cooking accessory for snowmobile, comprising:

a stainless steel oven which comprises a container, a top lid for covering said container, a receiving chamber disposed within said container for food to store therein, and a pair of locking hooks positioned on opposite sides of said container for keeping said top lid tightly covering on said container;

an attaching accessory means for receiving said stainless steel oven, which comprises an aluminum heat sink base which provides uniform heating to said stainless steel oven, an flat n-shape retaining wall integrally protruded from one edge of said aluminum heat sink base, an L-shape retaining wall having a free end integrally protruded from another edge of said aluminum heat sink base, and a flexible clip connected to a free end of said L-shape retaining wall, wherein said stainless steel oven is engaged between said flat n-shape retaining wall by first inserting one of said locking hooks to be held by said flat n-shape retaining wall to allow said another locking hook to be inserted thereunder; and an affixing means for affixing a food cooking accessory to an exhaust pipe of a snowmobile.

2. A food cooking accessory for snowmobile, as recited in claim 1, wherein said affixing means comprises two attaching ears integrally and inclinedly protruded from two opposite edges of a bottom side of said aluminum heat sink base, and elastic heat resistance spring having a C-shape adapter integrally extended from each end thereof, and an exhaust pipe guider which has an outer diameter equal to a diameter of said exhaust pipe of said snowmobile.

3. A food cooking accessory for snowmobile, as recited in claim 2, wherein said exhaust pipe guider is constructed by cutting said aluminum heat sink base and bending to form two guide rails, said attaching ears of said affixing means each having a central hole for said C-shape adapter of said elastic heat resistance spring to fasten therein respectively, so that said food cooking accessory is affixed to said exhaust pipe of said snowmobile as easy as by first fastening one of said C-shape adapters of said elastic heat resistance spring- to one of said central holes of said attaching ear of said affixing means, then setting said exhaust pipe guider on said exhaust pipe, and looping said elastic heat resistance spring around said exhaust so that said C-shape adapter extended from said other end of said elastic heat resistance spring is fastened to said other central hole.

4. A food cooking accessory for snowmobile, as recited in claim 1, wherein said affixing means comprises two attaching ears each of which is constructed by cutting said aluminum heat sink base and bending to form two semicircular attaching ears, an elastic heat resistance spring having a C-shape adapter integrally extended from each end, and an exhaust pipe guider which has an outer diameter equal to a diameter of said exhaust pipe of said snowmobile.

5. A food cooking accessory for snowmobile, as recited in claim 4, wherein said exhaust pipe guider is connected to a bottom surface of said aluminum heat sink base and said attaching ears of said affixing means each has a central hole for said C-shape adapter of said elastic heat resistance spring to fasten therein respectively, so that said food cooking accessory is affixed to said exhaust pipe of said snowmobile as easy as by first fastening one of said C-shape adapters of said elastic heat resistance spring to one of said central holes of said attaching ear of said affixing means, then setting said exhaust pipe guider on said exhaust pipe, and looping said elastic heat resistance spring around said exhaust pipe so that said C-shape adapter is extended from said other end of said elastic heat resistance spring is fastened to said other central hole.

* * * * *